Figure 1:
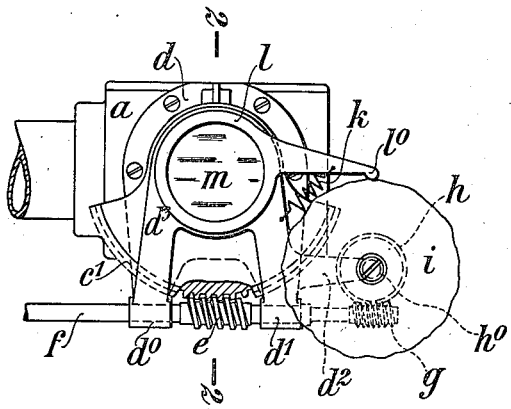

O. EPPENSTEIN.
HORIZONTAL TELEMETER.
APPLICATION FILED JAN. 15, 1915.

1,191,579.  Patented July 18, 1916.

Inventor:
Otto Eppenstein

UNITED STATES PATENT OFFICE.

OTTO EPPENSTEIN, OF JENA, GERMANY, ASSIGNOR TO THE FIRM OF CARL ZEISS, OF JENA, GERMANY.

HORIZONTAL TELEMETER.

1,191,579. Specification of Letters Patent. Patented July 18, 1916.

Application filed January 15, 1915. Serial No. 2,488.

*To all whom it may concern:*

Be it known that I, OTTO EPPENSTEIN, a citizen of the German Empire, residing at Jena, Germany, have invented a new and useful Horizontal Telemeter, of which the following is a specification.

The invention consists in an improvement in horizontal telemeters containing the base-line within themselves, in which, as for example in those according to my copending application, Serial Number 779,488, each of the two ray pencil systems belonging to the ends of the base-line passes through a deflecting device, which permits of the image formed from the pencil system and presented to the observer being displaced parallel to the base-line, and in which the said two devices are coupled with each other in such a manner that the two images can be jointly displaced in the direction of the base-line by a small amount. In practice, when manufacturing such instruments, it is hardly possible, to construct the separate parts of the coupling and to connect them with the telemeter and the deflecting devices so accurately that, on actuating the said devices, the images will be displaced together by exactly equal amounts, as is requisite for the maintenance of the adjustment of the telemeter for all directions of outlook. For this purpose according to the invention for removing any losses of adjustment, such as usually occur on the joint displacements of the two images taking place, a cam is used, which is jointly displaceable with the deflecting devices. The final form of the cam will generally be ascertained by setting a telemeter, which is fitted with a cam of a form that of itself would cause no alteration in the reading of the range-scale, at different directions of outlook to an object having a known distance and by removing any discrepancies of the value of the range indicated on the range-scale from its real value by an alteration of the original form of the cam at that part of it, which happens to be operative. When the size of the errors of measurement occurring, on the direction of outlook being altered, can be determined from the first, the form of the cam may be ascertained by calculation. This is the case, for instance, when those errors of measurement are to be corrected with the cam, which arise, when the alteration in the base-line of the telemeter, connected with a joint displacement of the two images by the deflecting devices, oversteps a certain small amount.

The cam may be used in various ways. For instance, an alteration in the reading of the range-scale may be caused by it directly, by coupling it with the said scale or its index in such a manner that an alteration in the setting of the cam causes a relative displacement of the scale and its index, or such an alteration in the reading can be caused indirectly, by coupling the cam with an arrangement, which alters the angle contained by the axes of the ray pencil systems belonging to the two ends of the base-line. This may, for instance, be effected, by coupling the cam with one of the well-known devices used with telemeters for obtaining for measuring or adjusting purposes an alteration of the said angle; when the deflecting devices serving for the joint displacement of the two images are so coupled with one another that they can be moved in opposite directions, the cam may be coupled with the deflecting devices in such a manner that an alteration in the setting of the cam causes an alteration in the relative position of these devices.

Figure 2:
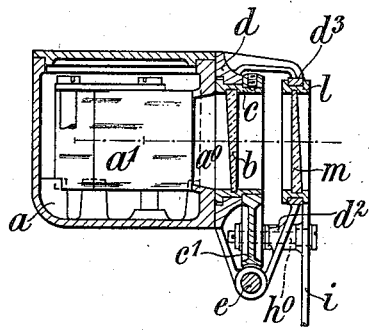
Figure 3:
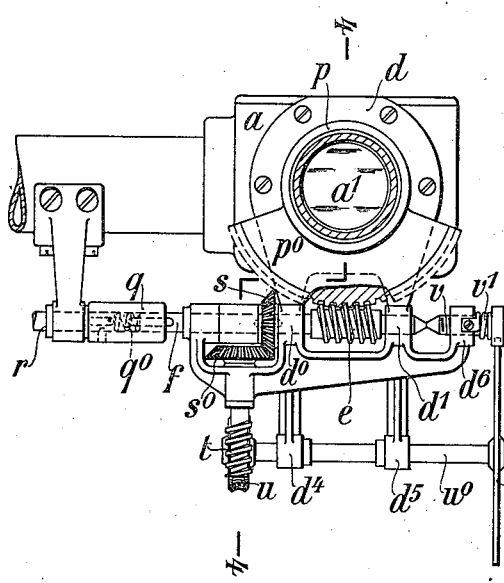
Figure 4:
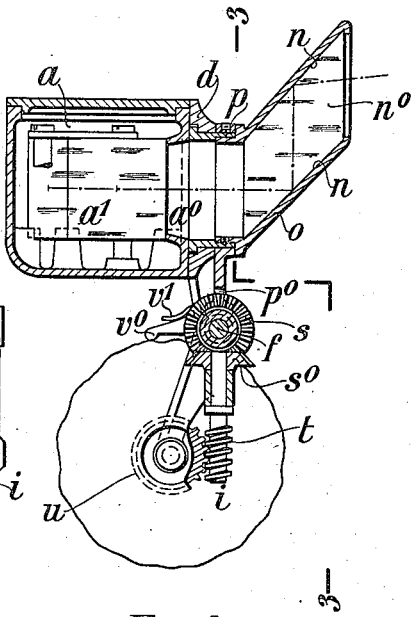

In the four figures of the annexed drawing two constructional examples of the invention are shown as fitted to one of the two head-parts of a telemeter, Figure 1 being a front elevation of one example and Fig. 2 a section on line 2—2 of Fig. 1 and Fig. 3 being a front elevation of the other example and Fig. 4 a section on line 4—4 of Fig. 3. Both sections are laid through the middle of the ray entrance opening perpendicular to the base-line of the instrument.

In the case of both constructional examples the cam fulfils its duty, by effecting an alteration in the angle contained by the axes of the ray pencil systems belonging to the two ends of the base-line.

In the first example (Figs. 1 and 2) in front of the light entrance opening $a^0$ of the prism casing $a$ there is disposed a glass wedge $b$, which represents the deflecting device. This wedge with its mount $c$ is journaled, so as to be rotatable about the entrance axis of the objective prism $a^1$ belonging to it, in the bearing body $d$, which is secured by screws to the casing $a$, in such a manner that the plane of its principal section is parallel to the said axis. The mount $c$ is fitted with a worm wheel segment $c^1$, with which a worm $e$ engages, the shaft $f$ of which is rotatable in the bearings $d^0$ and $d^1$ of the body $d$ and rotates along with the glass wedge $b$ the deflecting device at the other objective side of the telemeter. The free end of the worm shaft $f$ carries a second worm $g$, which engages with a worm wheel $h$ carried by the arm $d^2$ of the bearing body $d$, on the shaft $h^0$ of which worm wheel a cam $i$ is fixed. On the circumference of this cam there slides, controlled by the spiral spring $k$, a tappet $l^0$ forming a projection of a mount $l$, which carries a glass wedge $m$ located in front of the glass wedge $b$. The glass wedge $m$ has the plane of its principal section parallel to the entrance axis of the objective prism $a^1$ and is rotatable in a ring-shaped part $d^3$ of the bearing body $d$ about the said axis. Should, on an alteration of the direction of outlook taking place, the distance of the tappet $l^0$ from the axis of rotation of the disk $i$ vary, the glass wedge $m$ will be rotated through a small angle and by this means the direction is altered, in which the ray pencil system passing through it enters the wedge $b$.

In the second example (Figs. 3 and 4) there is disposed as deflecting device in front of the light entrance opening $a^0$ of the prism casing $a$ a reflecting prism $n^0$, having two reflecting surfaces $n$. By this reflecting prism the axial ray passing through it is deviated about a slight angle, as the upper reflecting surface deviates this ray about an angle, which is on a small amount greater than 45°, while the lower reflecting surface deviates it back again about an angle of 45°. The mount $o$ of the pair of reflectors $n$ is screwed to a ring $p$, which is rotatably journaled in a bearing body $d$ fixed to the casing $a$ and is fitted with a worm wheel segment $p^0$. With the latter there engages a worm $e$, the shaft $f$ of which rests in the bearings $d^0$ and $d^1$ and is coupled by means of a coupling $q$ with a shaft $r$, the driving shaft of the deflecting device at the other end of the base-line, in such a manner that both deflecting devices are actuated jointly. By means of a pair of bevel wheels, $s$, $s^0$, the driving wheel $s$ of which is mounted on the shaft $f$ in such a manner as to allow a slight axial displacement of the latter, a second worm $t$ is rotated, which engages with a worm wheel $u$. This latter worm wheel is fixed on a shaft $u^0$, which rests in the bearings $d^4$ and $d^5$ and carries a cam $i$. A screw $v$, to one end of which is fixed a tappet $v^0$, which, controlled by a spring $v^1$, slides on the circumference of the cam $i$, and the other end of which rests against the end surface of the free end of the shaft $f$, is disposed in an arm $d^6$ of the bearing body $d$ in such a manner that its rotation effects a displacement of the shaft $f$ and of the worm $e$ in the direction of their longitudinal axis and by this means an additional rotation of the prism $n^0$ lying at the end of the telemeter shown in the drawing. A spiral spring $q^0$ within the coupling $q$ causes the end surface of the free end of the shaft $f$ and the screw $v$ to be always in contact with one another. Hence, the cam, the setting of which is altered along with that of the deflecting devices, causes in this case an alteration in the relative position of the deflecting devices and thereby an alteration in the angle contained by the axes of the ray pencil systems belonging to the two ends of the base-line.

I claim:

1. In a horizontal telemeter containing the base-line within itself a measuring device, an ocular system, an ocular reflecting system, at either side of the said ocular reflecting system an objective lens and a deflecting device, the said deflecting devices being adapted to displace in the direction of the base-line the images formed from the ray pencil systems entering the instrument at either end of the base-line, actuating means for effecting a joint displacement of the two images in the same direction by a joint alteration of the setting of the said deflecting devices, a cam adapted to be actuated by the said actuating means and translating means actuated by the said cam and connected with one of the said deflecting devices for transmitting motion thereto.

2. In a horizontal telemeter containing the base-line within itself a measuring device, an ocular system, an ocular reflecting system, at either side of the said ocular reflecting system an objective lens and a deflecting device, the said deflecting devices being adapted to displace in the direction of the base-line the images formed from the ray pencil systems entering the instrument at either end of the base-line, actuating means for effecting a joint displacement of the two images in the same direction by a joint alteration of the setting of the said deflecting devices, an additional deflecting device disposed in the path of the ray pencil system belonging to one end of the base-line, and a cam adapted to be actuated by the said actuating means and means actuated by said cam and connected with the said additional deflecting device.

OTTO EPPENSTEIN.

Witnesses:
PAUL KRÜGER,
RICHARD HAHN.